Sept. 3, 1940.  A. E. HINTERMEYER  2,213,705
CUTTING TOOL
Filed Oct. 26, 1938
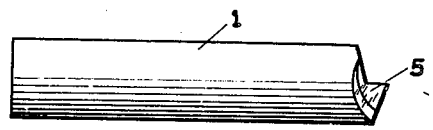
Fig. 1
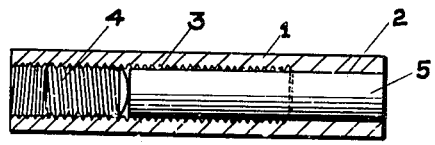 
Fig. 2  Fig. 3
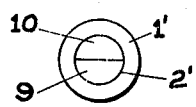
Fig. 4
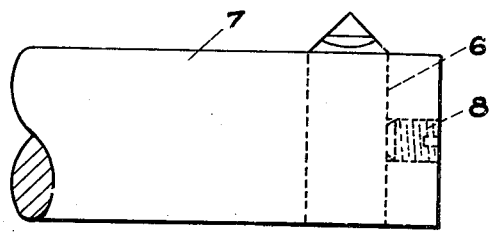
Fig. 5
Inventor
Alfred E. Hintermeyer
By Geo. H. Kennedy Jr.
Attorney Patented Sept. 3, 1940

2,213,705

UNITED STATES PATENT OFFICE 2,213,705

CUTTING TOOL

Alfred E. Hintermeyer, Worcester, Mass., assignor to The Heald Machine Company, Worcester, Mass., a corporation of Massachusetts Application October 26, 1938, Serial No. 237,019

4 Claims. (Cl. 29—96)

The present invention relates to cutting tools, particularly tools having a cutting point of extremely hard material, such as tungsten carbide.

In prior devices of this character the tool bit, which is of extremely hard material and therefore expensive, is mounted in the end of a tool holder and is held therein by a brazing alloy. The holder and the tool bit are then ground away to provide the desired contour of the cutting surface. When sharpening of the tool is necessary, after use, the holder, as well as the tool bit, is cut away, thereby reducing the effective length of the tool holder as well as shortening the tool bit.

The length of tool bit which can be successfully utilized in holders of this character is limited since there must be a substantial amount of holder projecting rearwardly of the tool bit so that the holder may be mounted in a boring bar. Moreover, the overall length of the holder is limited in boring by the diameter of the hole to be bored. Thus the length of the tool bit which can be utilized is relatively small so that the life of a tool of this character is limited.

In sharpening cutting tools of this character, the material of the tool bit being extremely hard, is most successfully cut by the use of a diamond wheel, but a diamond wheel is not satisfactory for grinding the steel from which the holder is made, since steel has a tendency to remove the diamond particles from the wheel.

The principal object of the present invention is to avoid the above objections by providing a cutting tool which can be sharpened by use of a diamond wheel, or the like, which comes in contact only with the hard material forming the tool bit. In accordance with the present invention, the tool bit is made somewhat longer than in the usual cutting tool and is advanced longitudinally of the holder when the cutting point has worn away. By this arrangement the tool bit may originally be made almost as long as the tool holder and may be utilized until it has been reduced to a very short length.

Other and further objects and advantages of the invention will appear from the following detailed description taken in connection with the accompanying drawing, in which—

Fig. 1 is a side elevation of a cutting tool embodying the invention.

Fig. 2 is a sectional view longitudinally through the tool of Fig. 1.

Fig. 3 is an end view of the tool of Fig. 2.

Fig. 4 is an end view of a modification.

Fig. 5 is a fragmentary end view of a boring bar, showing a cutting tool embodying the invention mounted therein.

Like reference characters refer to like parts in the different figures.

Referring first to Figs. 1 to 3 inclusive, the cutting tool comprises a tool holder 1 which is generally cylindrical in form and has a central bore 2 throughout the length thereof. For about three quarters of its length the bore 2 is threaded, as at 3, to receive a threaded plug 4, which is utilized, as will hereinafter appear, for advancing a tool bit 5 positioned in the bore.

The tool bit 5, which is circular in cross-section, as shown in Fig. 3, is slightly larger in diameter than the bore 2, and accordingly slightly larger than the diameter of the tops of the threads on the order of one or two thousandths of an inch. Thus, when the bit 5 is pressed through the bore, the slight roughness existing on substantially all tool bits of tungsten carbide, and other similar extremely hard material, perform a broaching action on the bore 2 and also the tops of the threads, so that the broached slots and the protuberances on the bit act as keyways and keys which prevent the bit from turning within the holder.

The tool bit, which is nearly as long as the holder, being preferably only enough shorter to permit the threaded plug 4 to enter the threaded bore 3, is advanced through the holder until the end of the bit is substantially in line with the end of the holder and the holder and tool bit are then cut away to provide the desired cutting surface on the end of the tool bit. One example of the cutting surface is shown in Fig. 1.

When the tool bit requires sharpening, after use, instead of grinding away both the holder and the bit, the latter is advanced slightly axially of the holder by turning the threaded plug 4 and then the bit itself is the only structure which requires cutting during the sharpening thereof. In this way excessive wear on the sharpening instrumentality, such as the diamond wheel, is avoided. It will be apparent that the tool bit, when new, is several times longer than the normal length of a tool bit when the latter is held in the holder by brazing and practically all of the tool bit may be utilized before the cutting tool is worn down so that it requires being discarded.

During the entire life of the cutting tool the holder 1 remains its full length and thereby presents a longer bearing surface to cooperate with the transverse bore 6 in the end of a boring bar 7, Fig. 5, in which the cutting tool is positioned. As is usual, a set screw 8 holds the cutting tool in position, and also provides for adjustment of the cutting tool as an entity relative to the boring bar for controlling the diameter of the opening bored. Thus the adjustment of the tool bit by the threaded plug 4 is utilized only for advancing the tool bit prior to sharpening thereof.

It will be understood that the cutting tool may be utilized for turning operations in lathes rather than in the boring bar structure of Fig. 5, the latter being shown merely to indicate one utility for a cutting tool of the character of the present invention and to show the utility for the adjustment of the tool bit by the threaded plug 4.

With reference to Fig. 4, the tool holder 1' has an axial bore 2' which receives, instead of the cylindrical tool bit of Fig. 2, a semi-cylindrical tool bit 9. With the semi-cylindrical tool bit is a similarly shaped filler piece 10 of inexpensive material, such as soft steel or brass. The radii of the tool bit 9 and filler piece 10, together, correspond substantially to the diameter of the bore 2', being slightly larger than said bore in the same manner as is the tool bit 5 larger than the bore 2. The structure of Fig. 4 is especially adapted for the boring or turning of soft materials, such as steel or brass, and when the tool bit 9 and filler piece 10 are advanced axially through the holder 1' by an adjustment similar to the threaded plug 4, the filler piece 10 may be filed back so that the only sharpening action performed occurs on the tool bit 9, which, as above stated, is of extremely hard material. Where extremely tough steel, such as alloy steels, are to be machined, it is frequently preferable to utilize the full round tool bit of Figs. 1 to 3 inclusive, since the curling chips from the material being machined will not wear away the portion of the tool bit above the cutting edge if the tool bit is entirely of extremely hard material.

From the foregoing it will be apparent that the present invention provides a cutting tool, the original cost of which may be somewhat greater than the cost of cutting tools where the tool bit is brazed into the end of the holder, but which has a substantially longer life and which utilizes a greater portion of the material of the tool bit before the cutting tool is discarded. The result is that the cost of cutting tools for performing a predetermined number of cutting operations is materially less than heretofore.

I claim:

1. In a cutting tool adapted to be positioned in a substantially radial bore in a supporting spindle, a holder having a substantially cylindrical surface and having a longitudinal bore therethrough, a tool bit positioned in said bore, and a threaded member at one end of said holder and engageable with the bit for advancing said bit in said bore, said bit corresponding so closely in diameter to the dimension of the bore to be a sufficiently tight fit therein to prevent unintended relative movement between the bit and holder.

2. In a cutting tool adapted to be positioned in a substantially radial bore in a supporting spindle, a holder having a substantially cylindrical surface and having a longitudinal bore therethrough said bore being threaded for at least a part of the length thereof, a tool bit and a cooperating filler piece positioned in said bore, and a threaded member in said bore at one end of said holder engageable with the bit and filler piece for advancing said bit and filler piece within said bore, said bit and cooperating filler piece together corresponding almost exactly in cross-sectional dimension to the bore to prevent unintentional relative movement between the bit, filler piece and holder.

3. In a cutting tool adapted to be positioned in a substantially radial bore in a supporting spindle, a tool holder of relatively soft material and having a longitudinally extending bore therein, said bore being threaded for at least a portion of its length and a tool bit of relatively hard material compared to that of the holder positioned in said bore, and threaded means for advancing said tool bit longitudinally of the holder, said bore and bit corresponding substantially in cross-sectional dimension, whereby as a result of the insertion of the bit within the holder any small irregularities on the surface of the bit will perform a broaching action on the holder, thereby holding the bit against turning within the holder.

4. In a cutting tool adapted to be positioned in a substantially radial bore in a supporting spindle, a holder of relatively soft material and having a longitudinally extending bore therein, said bore being threaded for at least a part of its length, a tool bit of relatively hard material compared to that of the holder in said bore, and a filler piece of relatively soft material, also positioned in said opening, said bit and filler piece together corresponding in cross-sectional dimension to the dimension of the longitudinally extending opening, said bit and filler piece being held against turning within the holder by the tight fit of the bit and filler in the opening in the holder, and threaded means in said bore for advancing said tool bit longitudinally of the holder.

ALFRED E. HINTERMEYER.